(12) United States Patent
Meador

(10) Patent No.: US 9,309,369 B1
(45) Date of Patent: *Apr. 12, 2016

(54) POLYIMIDE AEROGELS WITH THREE-DIMENSIONAL CROSS-LINKED STRUCTURE

(71) Applicant: The United States of America as represented by the Administrator of the National Aeronautics and Space Administration, Washington, DC (US)

(72) Inventor: Mary Ann B. Meador, Strongsville, OH (US)

(73) Assignee: The United States of America, as Represented by the Administrator of the National Aeronautics and Space Administration, Washington, DC (US)

( * ) Notice: Subject to any disclaimer, the term of this patent is extended or adjusted under 35 U.S.C. 154(b) by 190 days.

This patent is subject to a terminal disclaimer.

(21) Appl. No.: 14/168,830

(22) Filed: Jan. 30, 2014

Related U.S. Application Data

(63) Continuation of application No. 12/571,049, filed on Sep. 30, 2009, now abandoned.

(51) Int. Cl.
*C08J 9/28* (2006.01)

(52) U.S. Cl.
CPC .................................. *C08J 9/28* (2013.01)

(58) Field of Classification Search
CPC ..... C08G 73/1007; C08G 73/106; C08J 9/28; C08J 2205/026; C08J 2379/08
See application file for complete search history.

(56) References Cited

U.S. PATENT DOCUMENTS

| 6,399,669 B1 * | 6/2002 | Suzuki ....................... C08J 9/28 521/183 |
| 9,109,088 B2 * | 8/2015 | Meador ....................... C08J 9/00 |
| 2004/0132845 A1 * | 7/2004 | Rhine ................... B01J 13/0091 521/82 |
| 2006/0033225 A1 * | 2/2006 | Wang ..................... B82Y 30/00 264/29.6 |

* cited by examiner

*Primary Examiner* — John Cooney
(74) *Attorney, Agent, or Firm* — Robert H. Earp, III

(57) ABSTRACT

A method for creating a three dimensional cross-linked polyimide structure includes dissolving a diamine, a dianhydride, and a triamine in a solvent, imidizing a polyamic acid gel by heating the gel, extracting the gel in a second solvent, supercritically drying the gel, and removing the solvent to create a polyimide aerogel.

10 Claims, No Drawings

POLYIMIDE AEROGELS WITH THREE-DIMENSIONAL CROSS-LINKED STRUCTURE

CROSS-REFERENCE TO RELATED APPLICATIONS

This application is a continuation of U.S. patent application Ser. No. 12/571,049 filed Sep. 30, 2009, pending.

ORIGIN OF THE INVENTION

The invention described herein was made by employees of the United States Government and may be manufactured and used by or for the Government for Government purposes without the payment of any royalties thereon or therefore.

BACKGROUND

Field

This invention generally relates to polyimide aerogels, and more particularly to polyimide aerogels with three-dimensional covalently bonded cross-linked structure.

DEFINITIONS

Aerogels—a unique material for providing such properties because of their extremely low density and small pore sizes.

Anhydride—a functional derivative of a carboxylic acid in which the OH of the carboxyl group has been replaced by —COOR.

Backbone—the series of covalently bonded atoms that together create the continuous chain of the molecule.

Diamine—a type of polyamine with exactly two amino groups.

Dianhydride—Any compound containing two anhydride groups.

Oligomer—an oligomer consists of a limited number of monomer units, in contrast to a polymer that, at least in principle, consists of an unlimited number of monomers.

Polyamic acid—intermediate polymer in the production of polyimide made by the reaction of diamine with a cyclic dianhydride.

Polyimide (sometimes abbreviated PI)—the polymeric product of dehydration of the polyamic acid, the structure shown below being one example.

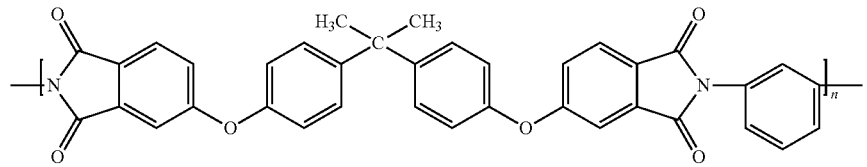

Supercritical Fluid—any substance at a temperature and pressure above its critical point. It can diffuse through solids like a gas, and dissolve materials like a liquid. Additionally, close to the critical point, small changes in pressure or temperature result in large changes in density.

Supercritical Fluid Extraction (SFE)—the process of separating one component (the extractant) from another (the matrix) using supercritical fluids as the extracting solvent. Extraction is usually from a solid matrix, but can also be from liquids.

Triamine—a type of polyamine with exactly three amino groups.

DESCRIPTION OF RELATED ART

Thermosetting polyimides are commercially available as uncured resins, stock shapes, thin sheets, laminates, and machines parts. Thermoplastic polyimides are very often called pseudothermoplastic. There are two general types of polyimides. One type, so-called linear polyimides, is made by combining imides into long chains. Aromatic heterocyclic polyimides are the other usual kind, where R' and R" are two carbon atoms of an aromatic ring. Examples of polyimide films include Apical, Kapton, UPILEX, VTEC PI, Norton TH and Kaptrex. Polyimides have been in mass production since 1955. Typical monomers include pyromellitic dianhydride and 4,4'-oxydianiline.

Lightweight, low density structures are desired for acoustic and thermal insulation for aerospace structures, habitats, and astronaut equipment and aeronautic applications. Aerogel is a manufactured material with the lowest bulk density of any known porous solid. It is derived from a gel in which the liquid component of the gel has been replaced with a gas. The result is an extremely low-density solid with several properties, most notably its effectiveness as a thermal insulator and its extremely low density. It is nicknamed frozen smoke, solid smoke, or blue smoke due to its translucent nature and the way light scatters in the material; however, it feels like expanded polystyrene to the touch. Aerogels are produced by extracting the liquid component of a gel through supercritical drying. This allows the liquid to be slowly drawn off without causing the solid matrix in the gel to collapse from capillary action, as would happen with conventional evaporation. The first aerogels were produced from silica gels.

Plain silica aerogels are brittle. Reinforcing the aerogel structure with polymer provide improvements in strength while maintaining low density and pore structure. Degradation of polymers used in cross-linking tend to limit use temperatures to below 150° C.

Polyimide aerogels can be fabricated from linear polyimides by allowing a low concentration polyimide/polyamic acid solution to gel, followed by heating to complete imidization and subsequent supercritical fluid extraction. Polyimide aerogels prepared in this way from, for example, oxydianiline (ODA) and pyrolimellitic dianhydride have high surface areas, low density, low thermal conductivity, and good ductility. However, gels shrink substantially during supercritical fluid extraction. SFE can be used as a sample preparation step for analytical purposes, or on a larger scale to either strip unwanted material from a product (e.g. decaffeination) or collect a desired product (e.g. essential oils). Carbon dioxide ($CO_2$) is the most used supercritical fluid, sometimes modified by co-solvents such as ethanol or methanol. Extraction conditions for supercritical $CO_2$ are above the critical temperature of 31° C. and critical pressure of 74 bar. Addition of modifiers may slightly alter this. The discussion below will mainly refer to extraction with $CO_2$, except where specified. Supercritical fluids are suitable as a substitute for organic solvents in a range of industrial and laboratory processes. Carbon dioxide and water are the most commonly used supercritical fluids, being used for decaffeination and power generation respectively. In addition, there is no surface tension in a supercritical fluid, as there is no liquid/gas phase boundary. By changing the pressure and temperature of the fluid, the properties can be "tuned" to be more liquid or more gas like. One of the most important properties is the solubility of material in the fluid. Solubility in a supercritical fluid tends to increase with density of the fluid (at constant temperature). Since density increases with pressure, then solubility also tends to increase with pressure. The relationship with temperature is a little more complicated. At constant density, solubility will increase with temperature. However, close to the critical point, the density can drop sharply with a slight increase in temperature. Therefore, close to the critical temperature, solubility often drops with increasing temperature, then rises again. All supercritical fluids are completely miscible with each other so for a mixture a single phase can be guaranteed if the critical point of the mixture is exceeded. The critical point of a binary mixture can be estimated as the arithmetic mean of the critical temperatures and pressures of the two components, $$T_{c(mix)} = (\text{mole fraction } A) \times T_c A + (\text{mole fraction } B) \times T_c B$$

For greater accuracy, the critical point can be calculated using equations of state or group contribution methods. Other properties, such as density, can also be calculated using equations of state.

Aerogels are solid materials that consist of a highly porous network of micro-sized and meso-sized pores. The pores of an aerogel can frequently account for over 90% of the volume when the density of the aerogel about 0.05 gram/cc. Aerogels are generally prepared by a supercritical drying technique to remove the solvent from a gel (a solid network that encapsulates its solvent) such that no solvent evaporation can occur and consequently no contraction of the gel can be brought by capillary forces at its surface. Therefore, aerogel preparation through a sol-gel process proceeds in 3 steps: dissolution of the solute in a solvent, formation of the sol, formation of the gel, and solvent removal by either supercritical drying technique or any other method that removes solvent from the gel without causing pore collapse.

Typically, the synthesis of polyimide gels at very low solute concentration is the first step in the preparation of polyimide aerogels. Precursor poly(amic acids) are imidized in solution at elevated temperatures, some polyimides will gel as the reaction solution is quenched from the high reaction temperature to ambient temperature. However, solution imidization at elevated temperatures is accompanied by hydration leading to depolymerization of the poly(amic acids) and results in a weakened gel. Such gels do not have sufficient mechanical strength to yield low-density polyimide aerogels. It has been reported that chemical imidization of some poly (amic acids) at a solute concentration above 10 to 15% (wt./wt.) produces gels probably induced by intermolecular cross-linking. Such gels are mechanically weak and the high solute concentrations are not feasible for producing a low-density aerogel. (Where did this come from?)

Reinforcing of polymers and polymer matrix composites has conventionally been done by the inclusion of particles or fibers into the polymer matrix. The adhesion between the matrix and the reinforcing materials has typically been weak, limiting the performance of the reinforced system compared to its theoretical performance. Fibers are often used with a coating which is intended to become involved with the polymer matrix, strengthening the interface between matrix and reinforcement. These interface modifiers have met with varied degrees of success, with the end result that the interface between the reinforcement and the matrix is still a weak spot, particularly for high-temperature materials such as polyimides.

SUMMARY

Polyimide aerogels with three-dimensional covalently bonded cross-linked structure which are made using linear oligomeric segments of polyimide and linked with one of the following into a three dimensional structure: trifunctional aliphatic or aromatic triamines; latent reactive endcaps such as nadic anhydride or phenylethynylphenyl amine; silica or silsesquioxane cage structures decorated with amine. Drying the gels supercritically maintains the solid structure of the gel, creating a polyimide aerogel with improved mechanical properties over linear polyimide aerogels.

At least one of the embodiments provides for the manufacture of small (micro to nano-scale) particles of silica or other ceramic materials which are covalently bonded to a polymer fragment.

Other benefits and advantages will become apparent to those skilled in the art to which it pertains upon reading and understanding of the following detailed specification.

DETAILED DESCRIPTION

In one embodiment, a polyimide aerogel fabricated by using tri, tetra, or polyfunctional units in the structure to create a three-dimensional covalently bonded network. Such cross-linked polyimides typically have a higher glass transition temperature above 300 to 400° C. The reinforcement provided by the three-dimensional network should improve mechanical stability, and prevent shrinkage on supercritical fluid extraction. One example of this embodiment uses 1,3,5-(triaminophenoxy)benzene (TAB) with diamines and dianhydride to form the three-dimensional polyimide according to Scheme 1. Gelation of the polyamic acid occurs rapidly in 5-10 w/w % solutions when n=1 to 10. Subsequent heating with or without catalysts to affect imidization followed by supercritical fluid extraction gives three-dimensional polyamide aerogel structures.

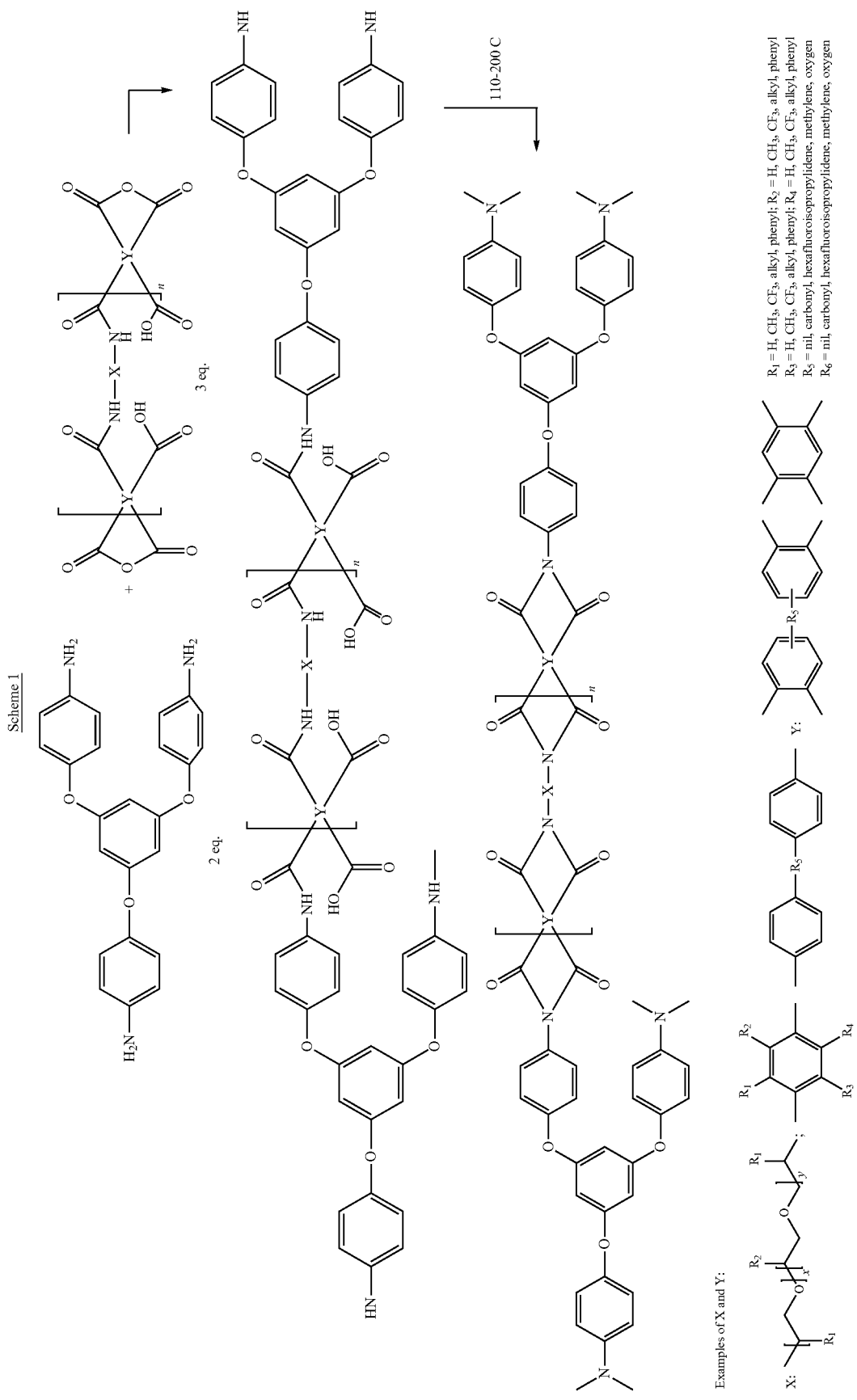

Example 1

3,3',4,4'-benzophenonetetracarboxylic dianhydride (BTDA), 3,4-oxydianiline (ODA), 1,3,5-tris-(4-aminophenoxy)benzene (TAB) are used to make three dimensional cross-linked aerogels using N-methyl-2-pyrrolidinone (NMP), dimethylformamide (DMF), or dimethylacetamide (DMAc) as solvent. 1,4-diazabicyclo[2.2.2]-octane (DABCO) is used as catalyst for imidization. Poly amic acid solution was prepared as a 10% (w/w) solution of diamine, dianhydride, and triamine dissolved in 20 mL DMF. BTDA (1.1761 g), ODA (0.3654 g), and small amount of DABCO were placed into a 125 mL glass vial, which was capped. Into a second 125 mL glass vial, TAB (0.4860 g) was measured and the vial was capped. The vials were placed into a glove-box, and 10 mL of dry DMF was pipetted into each glass vial to dissolve the contents. Once all solutions were completely dissolved, TAB solution was added to the BTDA/ODA/DABCO solution and the new solution was mixed quickly and poured into glass molds. Poly amic acid gels formed in less than one minute. The molds containing poly amic acid gels were placed into an oven at 115° C. for 8½ hours to imidize the gels. Imidized gels were extracted into a solution of 25% acetone in DMF and soaked for twenty-four hours. Solution was drained and replaced with 50% acetone in DMF and soaked for twenty-fours. This was repeated at 75% acetone in DMF and 100% acetone. Polyimide gels were dried supercritically using an Applied Separations supercritical dryer. Acetone was replaced with liquid $CO_2$, then temperature and pressure were increased until $CO_2$ became supercritical. All solvent was removed, producing polyimide aerogels with no shrinkage and having a density of 0.09 g/cm3 and surface areas from nitrogen sorption spectroscopy of 400 $m^2$/g. Solid NMR, FTIR, DSC, and TGA confirmed that imidization was complete. Young's modulus of compression for the aerogels was 0.6 MPa.

Example 2

BTDA (0.961 g) and ODA (0.448 g) were dissolved in 12 ml of DMF solvent was added to dissolve the solutes. In tube B, TAB (0.199 g) was dissolved in 2.24 ml DMF. The two solutions were quickly mixed at room temperature after dissolving. The mixture was poured into a mold made by cutting the end off of a twenty ml disposable syringe. Polyamic acid gel was formed in 30 seconds. The gel was extracted into a solvent solution that contained 4 ml of acetic anhydride, 3.4 ml of pyridine, and 72.60 ml of DMF. After aging in this solvent solution overnight, the polyamic acid gel was imidized in the oven at 115° C. for 8.5 hours. The polyimide wet-gel was first washed in 100% DMF, then 75%/25% DMF/acetone, followed by 50%/50% DMF/acetone, then 25%/75% DMF/acetone, and finally 100% acetone in twenty four hour increments. After the final solvent exchange, the polyimide wet-gel was supercritical dried in the $CO_2$ supercritical dryer. The resulting aerogel had a density of 0.077 g/$cm^3$. Young's modulus of compression for the aerogel was 0.6 MPa.

Example 3

For a polyimide aerogel with oligomer length between TAB cross-links of n=3, biphenyl 3,4,3',4'tetracarboxylic dianhydride (BPDA) (0.82 g) and Bis(aminophenyl)xylylene (BAX) (0.60 g) were dissolved in 12 ml of NMP solvent. TAB (0.180 g) was dissolved in 1.13 ml NMP. The two solutions were quickly mixed at room temperature after dissolving. The mixture was poured into a mold made by cutting the end off of a twenty ml disposable syringe. Polyamic acid gel was formed in 20 seconds. The gel was extracted into a solvent solution that contained 4 ml of acetic anhydride, 3.4 ml of pyridine, and 72.60 ml of NMP. After aging in this solvent solution overnight, the polyamic acid gel was imidized in the oven at 170° C. for 4 hours. The polyimide wet-gel was first washed in 100% NMP, then 75%/25% NMP/acetone, followed by 50%/50% NMP/acetone, then 25%/75% NMP/acetone, and finally 100% acetone in twenty four hour increments. After the final solvent exchange, the polyimide wet-gel was supercritical dried in the $CO_2$ supercritical dryer. The resulting aerogel had a density of 0.8 g/$cm^3$.

Example 4

For a polyimide aerogel with oligomers length of n=5 between TAB cross-links, BTDA (0.564 g) and BAX (0.421 g) were dissolved in 8 ml of DMF solvent in tube A. In tube B, TAB (0.078 g) was dissolved in 1.49 ml DMF. The two solutions were quickly mixed at room temperature after dissolving. The mixture was poured into a mold made by cutting the end off of a twenty ml disposable syringe. Polyamic acid gel was formed in 43 seconds. The gel was extracted into a solvent solution that contained 4 ml of acetic anhydride, 3.4 ml of pyridine, and 72.60 ml of DMF. After aging in this solvent solution overnight, the polyamic acid gel was imidized in the oven at 115° C. for 8.5 hours. The polyimide wet-gel was first washed in 100% DMF, then 75%/25% DMF/acetone, followed by 50%/50% DMF/acetone, then 25%/75% DMF/acetone, and finally 100% acetone in twenty four hour increments. After the final solvent exchange, the polyimide wet-gel was supercritical dried in the $CO_2$ supercritical dryer. The resulting aerogel had a density of 0.9 g/$cm^3$.

In another embodiment, cross-linking of the polyimide can be carried out by capping long chain oligomers with latent reactive endcaps such as nadic anhydride or phenylethynlyphenylamine, and after supercritical fluid extraction, the cross-linking is carried out on a post cure of the dried gels. In one embodiment, nadic anhydride is used as the endcaps as shown in Scheme 2. Nadic capped polyimide oligomers of n=4 to 20 gel within 15 to 50 minutes. Supercritical fluid extraction and subsequent heating of the aerogel to 300-315° C. causes the nadic groups to cross-link as shown, giving a stable network structure.

Scheme 2.

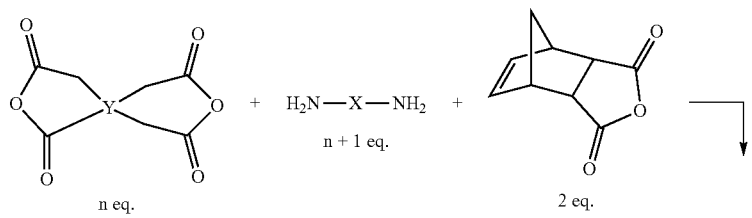

-continued

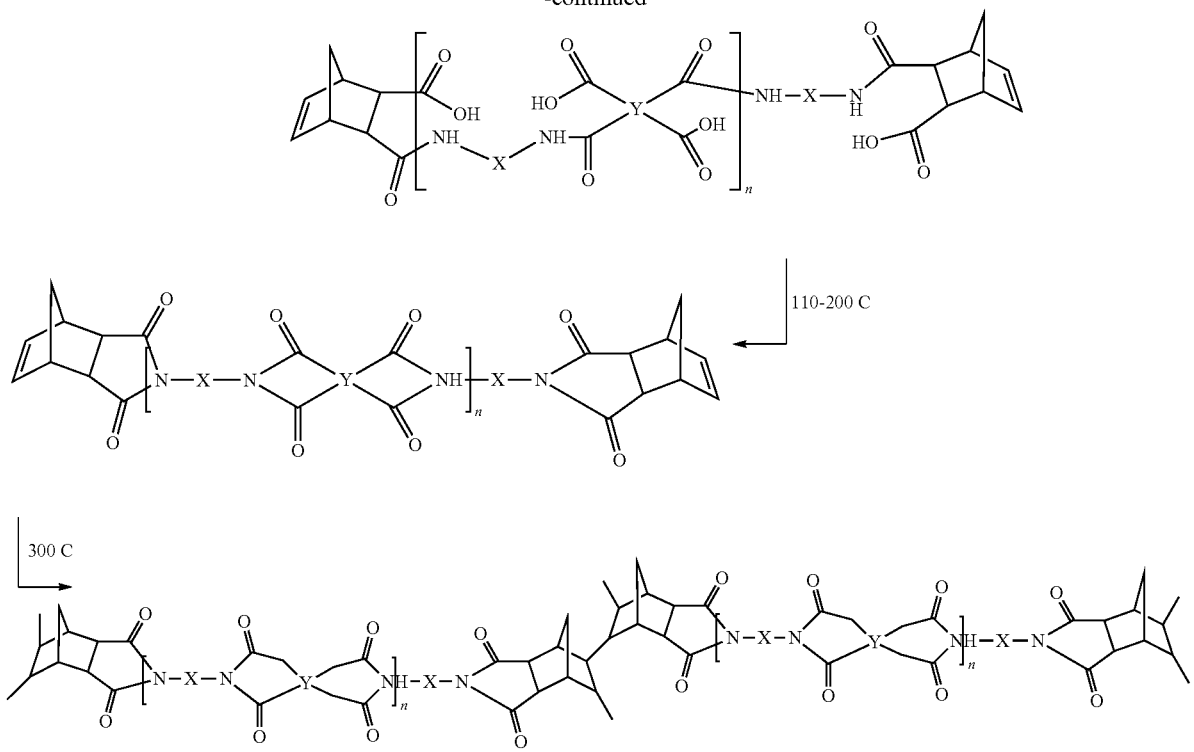

Examples of X and Y:

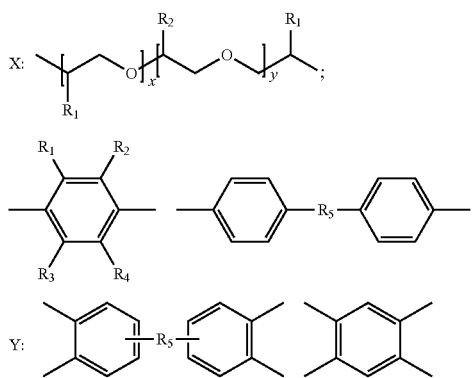

$R_1$ = H, $CH_3$, $CF_3$, alkyl, phenyl; $R_2$ = H, $CH_3$, $CF_3$, alkyl, phenyl
$R_3$ = H, $CH_3$, $CF_3$, alkyl, phenyl; $R_4$ = H, $CH_3$, $CF_3$, alkyl, phenyl
$R_5$ = nil, carbonyl, hexafluoroisopropylidene, methylene, oxygen
$R_6$ = nil, carbonyl, hexafluoroisopropylidene, methylene, oxygen

Example 5

For n=10 oligomer from Scheme 2, BPDA (4.0940 g) and BAX (4.4753 g) were heated and stirred in 20 ml N-methyl-2-pyrrolidinone (NMP) to dissolve. In the meantime, nadic anhydride (0.4569 g) was dissolved in 5 ml NMP. When the mixture of BPDA and BAX was cooled down, the solutions combined in one clean and dried 50 ml volumetric flask, and the volumetric flask was filled to 50 ml with NMP and shaken to mix the solution. The solution in the volumetric was combined with acetic anhydride (10 ml) and pyridine (5 ml) and poured into molds. Gelation occurred within 30 minutes. Gels were extracted into clean NMP and heated in oven at 110° C. for 8.5 hours. Afterwards, gel solvent is exchanged gradually into acetone as previously described. Supercritical drying yields aerogels with density of 0.12 g/cm³. Subsequent heating of aerogel to 300° C. causes nadic endcaps to cross-link as shown in Scheme 2.

In another embodiment, polyimide or polyamic acid can be capped with trialkoxy silanes which can be co-reacted with small amounts of tetraalkoxy silanes to form regions of covalently bonded silica crosslinks as shown in Scheme 3. In this case, n=1 to 10 polyimide oligomers combined with pre-hydrolyzed tetraethyl orthosilicate (TEOS) and base catalyst.

Scheme 3.
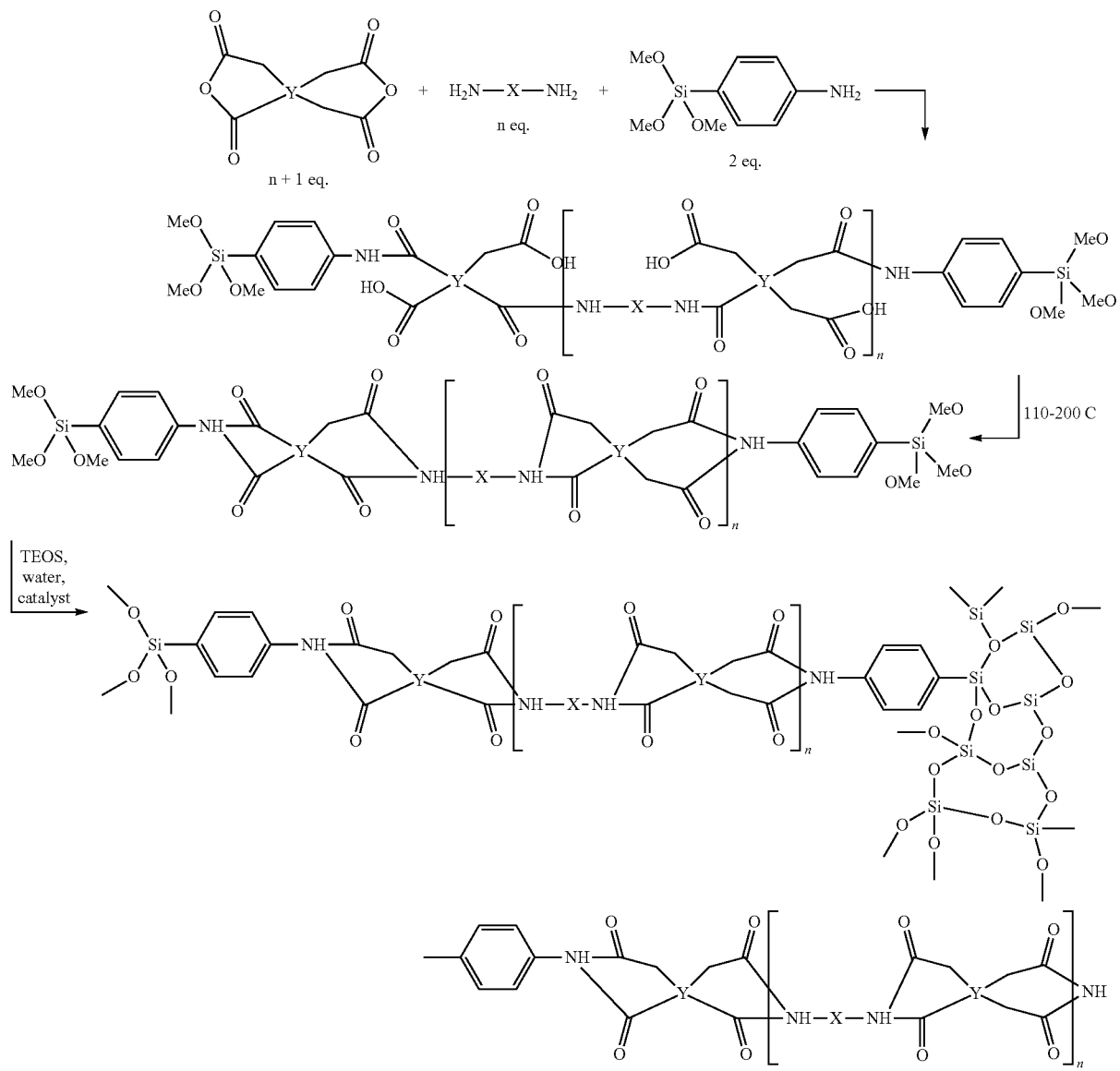
Examples of X and Y:
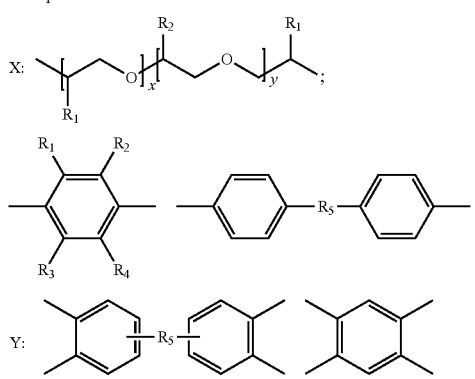
$R_1$ = H, $CH_3$, $CF_3$, alkyl, phenyl; $R_2$ = H, $CH_3$, $CF_3$, alkyl, phenyl
$R_3$ = H, $CH_3$, $CF_3$, alkyl, phenyl; $R_4$ = H, $CH_3$, $CF_3$, alkyl, phenyl
$R_5$ = nil, carbonyl, hexafluoroisopropylidene, methylene, oxygen
$R_6$ = nil, carbonyl, hexafluoroisopropylidene, methylene, oxygen In another embodiment, similar to that shown in Scheme 3, TEOS can be replaced with polysilsesquioxane cages (POSS) decorated with surface amines to co-react with anhydride capped polyimide/polyamic acid. In this case, anhydride capped polyimide or polyamic acid oligomers of n=1 to 10 can be reacted with triamino- or tetraamino-POSS at room temperature. Gelation occurs in 5 to 50 minutes, followed by heating to 110° C. with catalyst or 180° C. without catalyst to imidize.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

I claim:

1. An aerogel consisting of a porous cross-linked polyimide network comprising a plurality of anhydride end-capped polyamic acid oligomers, wherein the oligomers (i) comprise oligomers having repeating units of a dianhydride and a diamine that have terminal anhydride groups, (ii) are cross-linked after the oligomers are formed via a cross-linking agent, comprising three or more amine groups, at a balanced stoichiometry of the amine groups to the terminal anhydride groups, and (iv) have been imidized to yield the porous cross-linked polyimide network.

2. The aerogel of claim 1, wherein the dianhydride is selected from the group consisting of benzophenone-3,3',4,4'-tetracarboxylic dianhydride, 2,2'-bis(3,4'-dicarboxyphenyl)hexafluoropropane dianhydride, and biphenyl-3,3',4,4'-tetracarboxylic dianhydride.

3. The aerogel of claim 1, wherein the diamine is selected from the group consisting of 3,4-oxydianiline, 4,4'-oxydianiline, p-phenylene diamine, 2,2'-dimethylbenzidine, bisaniline-p-xylidene, 4,4'-bis(4-aminophenoxy)biphenyl, and 2,2'-bis[4-(4-aminophenoxy)phenyl]propane.

4. The aerogel of claim 1, wherein the diamine comprises (i) 4,4'-oxydianiline and (ii) p-phenylene diamine or 2,2'-dimethylbenzidine.

5. The aerogel of claim 1, wherein the cross-linking agent is selected from the group consisting of a triamine, an aliphatic amine comprising three or more amines, an aliphatic triamine, an aromatic amine comprising three or more amine groups, an aromatic triamine, 1,3,5-tri(aminophenoxy)benzene, a silica cage structure decorated with three or more amines.

6. The aerogel of claim 1, wherein the oligomer has been chemically imidized to completion.

7. The aerogel of claim 1, wherein the oligomer has been thermally imidized to completion.

8. The aerogel of claim 1, wherein the aerogel was obtained by supercritical fluid extraction.

9. The aerogel claim 1, wherein the aerogel has a density of 0.077 to 0.3 g/cm$^3$.

10. The aerogel of claim 1, wherein the aerogel has a porosity of 80 to 95%.

* * * * *